(12) United States Patent
Mutter et al.

(10) Patent No.: US 11,750,416 B2
(45) Date of Patent: Sep. 5, 2023

(54) SUBSCRIBER STATION FOR A SERIAL BUS SYSTEM AND METHOD FOR COMMUNICATING IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 51 days.

(21) Appl. No.: 17/594,374

(22) PCT Filed: Apr. 8, 2020

(86) PCT No.: PCT/EP2020/060000
§ 371 (c)(1),
(2) Date: Nov. 18, 2021

(87) PCT Pub. No.: WO2020/212217
PCT Pub. Date: Oct. 22, 2020

(65) Prior Publication Data
US 2022/0209984 A1 Jun. 30, 2022

(30) Foreign Application Priority Data
Apr. 16, 2019 (DE) ...................... 10 2019 205 487.0

(51) Int. Cl.
*H04L 12/40* (2006.01)
(52) U.S. Cl.
CPC .... *H04L 12/40084* (2013.01); *H04L 12/4015* (2013.01); *H04L 2012/40215* (2013.01)
(58) Field of Classification Search
CPC .......... H04L 12/40084; H04L 12/4015; H04L 12/417; H04L 2012/40215
See application file for complete search history.

(56) References Cited

U.S. PATENT DOCUMENTS

| 6,111,888 A * | 8/2000 | Green ............... H04L 12/40026 370/461 |
| 2003/0058882 A1 | 3/2003 | Fleury |

(Continued)

FOREIGN PATENT DOCUMENTS

| CN | 106063198 A | 10/2016 |
| DE | 69807235 T2 | 12/2002 |

(Continued)

OTHER PUBLICATIONS

International Search Report for PCT/EP2020/060000 dated Jun. 26, 2020.
ISO 11898-1:2015 Standard, 2015, pp. 1-74.

*Primary Examiner* — Stephen J Clawson
(74) *Attorney, Agent, or Firm* — NORTON ROSE FULBRIGHT US LLP; Gerard Messina (57) ABSTRACT

A subscriber station for a serial bus system. The subscriber station has a communication control device for controlling a communication of the subscriber station with at least one other subscriber station, a transmitting/receiving device for transmitting a transmission signal generated by the communication control device, and a scheduling unit for scheduling a temporal access of the subscriber station to the bus in at least one time slot of a cycle of temporally consecutive time slots. At least one time slot is provided in a cycle for each subscriber station of the bus for transmitting its transmission signal and the cycle repeats cyclically. The scheduling unit determines, together with the other subscriber stations of the bus in the operation of the bus system using a priority of the transmission signal, which time slot of the cycle the transmitting/receiving device may use for transmitting the transmission signal on the bus.

15 Claims, 5 Drawing Sheets

(56) References Cited

U.S. PATENT DOCUMENTS

2019/0126774 A1* 5/2019 Demont ............. H01M 10/425
2022/0006665 A1* 1/2022 Kajuluri ................. H04W 4/48

FOREIGN PATENT DOCUMENTS

| EP | 0952707 A2 | 10/1999 |
| EP | 1223711 A2 | 7/2002 |
| EP | 1814253 A1 | 8/2007 |
| WO | 2012020761 A1 | 2/2012 |
| WO | 2016012502 A1 | 1/2016 |

* cited by examiner

SUBSCRIBER STATION FOR A SERIAL BUS SYSTEM AND METHOD FOR COMMUNICATING IN A SERIAL BUS SYSTEM

FIELD

The present invention relates to a subscriber station for a serial bus system and to a method for communicating in a serial bus system, which allow for communication in real-time critical applications.

BACKGROUND INFORMATION

For communication between sensors and control units, for example in vehicles, a bus system is used ever more frequently, instead of a point-to-point connection, for reasons of costs, data being transmitted in the bus system as messages by CAN FD in the ISO 11898-1:2015 standard as the CAN protocol specification. The messages are transmitted between the subscriber stations of the bus system such as sensors, control units, transmitters, etc. Currently, CAN FD is used in the introductory phase in the first step usually at a data bit rate of 2 MBit/s in the transmission of bits of the data field and at an arbitration bit rate of 500 kbit/s in the transmission of bits of the arbitration field in the vehicle.

To prevent collisions of messages of different subscriber stations on the bus, CAN uses the CSMA/CR method (CR=collision resolution). Collisions are thereby resolved using a so-called arbitration at the beginning of a message or a frame. In the arbitration, an identifier (ID) is evaluated to determine which message may be transmitted next. In the process, the message or frame prevails whose identifier has the highest priority. This corresponds to strict priority scheduling. This suffices for many applications in the autonomous vehicle.

The arbitration has the effect, however, that current CAN-based bus systems cannot be used for cases of application that require a 100% deterministic bus access, that is, a guarantee that a subscriber station of the bus system is definitely able to transmit a message or a frame at a certain time.

SUMMARY

It is an objective of the present invention to provide a subscriber station for a serial bus system and a method for communicating in a serial bus system, which resolve the aforementioned problems. In particular, a subscriber station for a serial bus system and a method for communication are to be provided, which are usable in a communication for real-time critical applications and in which in particular a 100% deterministic bus access is possible.

The objective may be attained by a subscriber station for a serial bus system in accordance with the present invention. In accordance with an example embodiment of the present invention, the subscriber station has a communication control device for controlling a communication of the subscriber station with at least one other subscriber station of the bus system, a transmitting/receiving device for transmitting a transmission signal generated by the communication control device in a frame on a bus of the bus system, and a scheduling unit for scheduling a temporal access of the subscriber station to the bus in at least one time slot of a cycle of temporally consecutive time slots, at least one time slot being provided in a cycle for each subscriber station of the bus for transmitting its transmission signal and the cycle repeating cyclically, and the scheduling unit being designed to determine, together with the other subscriber stations of the bus in the operation of the bus system using a priority of the transmission signal, which time slot of the cycle the transmitting/receiving device may use for transmitting the frame for the transmission signal on the bus.

In a bus system, to which the subscriber stations described above are connected, it is ensured that every subscriber station is deterministically able to access the bus. Consequently, each of the subscriber stations receives a guaranteed minimum communication bandwidth on the bus at least for the time, during which the bus is to be accessed deterministically. This makes it possible to implement real-time critical applications using even a CAN-based bus system.

The subscriber station may be used with any communication protocol that operates in accordance with the CSMA/CR method, for example with any CAN-based communication protocol, in particular, however, with CAN XL, a CAN FD successor.

In the subscriber station according to an example embodiment of the present invention, it is also very advantageous that it is possible to activate the function of the deterministic scheduling for the deterministic bus access, as needed, even in continuous operation. The subscriber station is thus designed to carry out two different communication methods, namely, to carry out either a CSMA/CR method, which implements "strict priority scheduling", or a CSMA/CR method with additional deterministic scheduling. This is a great advantage compared to bus systems, in which respectively only one of the mentioned communication methods is possible, such as for example 10BASE-T1S, Flexray, etc. A further very great advantage is that the approach described here is considerably simpler in terms of configuration and use than previous methods.

The subscriber station in accordance with an example embodiment of the present invention is designed in such a way that it itself organizes, together with the other subscriber stations on the bus, which subscriber station may transmit the next message. The configuration of the subscriber station and of the associated bus system is thus self-organizing. This makes the configuration very simple to accomplish. As a result, there is hardly any additional personnel training required for configuring the bus system and the subscriber station.

An additional advantage of the subscriber station is the fact that no "single point of failure" is possible, as is the case in the master node required for 10BASE-T1S. That is to say, when a subscriber station fails due to a defect and therefore no longer transmits anything, this has no negative effects on the communication on the bus.

Depending on the implemented variant of the deterministic scheduling, the subscriber station may provide either the same maximum delays (worst case delays) as PLCA of 10BASE-T1S or maximum delays (worst case delays) that are shorter by approximately 50% than PLCA of 10BASE-T1S.

Additionally, it is possible to extend the subscriber station, depending on the application or desire, with many additional functions, since the arbitration is always available. For transmission, it is possible for example to make use of an unused time slot of another subscriber station of the bus system. It is also possible to implement a weighted cyclical transmission (weighted round robin), in which some subscriber stations are allowed to transmit more messages per cycle or round than other subscriber stations. Another option is for a subscriber station of the bus system to be able to transmit in its time slot during a cycle also multiple shorter messages instead of a message of maximum length. This allows for fairness regarding the bandwidth available on the bus, instead of merely with regard to the number of messages transmitted or transmittable by each subscriber station.

As a consequence, the subscriber station can be used to implement a transmission and reception of messages with great flexibility with regard to bus access, and thereby a very great range of quality of service requirements and thus applications may be realized.

Advantageous further developments of the subscriber station are disclosed here.

According to one variant of the present invention, the scheduling unit is designed to determine, together with the other subscriber stations of the bus, a transmission order on the bus for the subscriber stations of the bus in an at least temporarily dynamic manner and/or in an at least temporarily static manner.

According to a special variant of an embodiment of the present invention, the scheduling unit has a counting module, which is designed to increment its count value with every frame received from the bus and to increment it with every transmission opportunity for a time slot that elapsed unused, the counting module being designed to reset its count value to a starting value when the count value equals the number of time slots that are provided in the cycle.

In this case, the counting module may be designed to increment its count value with every frame received from the bus following the reception of a bit, which signals the beginning of a frame, even if the frame is later aborted by the subscriber station transmitting the frame due to an error. In this case, the scheduling unit may be designed to approve a temporal access of the subscriber station to the bus for the next time slot of the cycle if the count value of the counting module is equal to the number of time slots that are provided in the cycle, the counting module being designed to set its count value to 1 if the transmitting/receiving device has transmitted a transmission signal generated by the communication control device in a frame or at least one bit of the frame on the bus or lets the transmission opportunity elapse unused.

According to one exemplary embodiment of the present invention, the scheduling unit is designed to approve a temporal access of the subscriber station to the bus in a time slot of the cycle if the subscriber station or another subscriber station of the bus lets its transmission opportunity elapse unused.

It is possible for the communication control device to be designed to partition the frame, at least in a switch-on phase of the bus, into a first communication phase and a second communication phase, it being negotiated in the first communication phase, which of the subscriber stations of the bus obtains an at least temporarily exclusive, collision-free access to the bus in the subsequent second communication phase.

It is possible that the number of time slots per cycle is greater than the number of time slots assigned to the subscriber stations of the bus per cycle, it being negotiated in the first communication phase in a time slot that is not assigned to a subscriber station of the bus, which of the subscriber stations of the bus gains at least temporarily exclusive, collision-free access to the bus in the subsequent second communication phase.

Optionally, the minimum duration of a time slot may be selected as a bit time of a bit of the first communication phase.

Optionally, the scheduling unit may be designed to transmit, in a time slot assigned to the subscriber station, a frame with a priority that is higher than a priority of a frame, which the scheduling unit is designed to transmit in a time slot that is assigned to another subscriber station of the bus.

Alternatively, it is possible that the minimum duration of a time slot is two bit times of a bit of the first communication phase, the scheduling unit being designed to approve a temporal access of the subscriber station to the bus in the second bit of a time slot of the cycle, if the subscriber station or another subscriber station of the bus in the first bit of the time slot lets its transmission opportunity elapse unused.

The communication control device is possibly designed to include in the transmission signal a subscriber station number, which on the bus is exclusively assigned to the subscriber station, the scheduling unit being prepared to approve a temporal access of the subscriber station to the bus in the time slot assigned to the subscriber station, if the scheduling unit is able to evaluate a subscriber station number in a frame received from the bus.

In one development of the present invention, the number of time slots that are assigned to the subscriber station per cycle may be at least temporarily unequal to a number of time slots that are assigned to another subscriber station of the bus per cycle.

In another development of the present invention, the subscriber station may be designed to transmit more than one frame per time slot on the bus. Additionally or alternatively, the number of frames that the subscriber station is allowed to transmit per time slot on the bus may be at least temporarily unequal to a number of frames that another subscriber station of the bus is allowed to transmit per time slot on the bus.

Optionally, the communication control device is designed to transmit at the beginning of a recessive bit in the time slot assigned to the subscriber station a dominant pulse that is shorter than the bit time of the recessive bit, if the communication control device lets its transmission opportunity elapse unused.

According to another option of the present invention, the subscriber station is designed in such a way that the scheduling unit may be switched on or off depending on the time requirements of the communication on the bus, or that an operating mode of the scheduling unit is changeable by configuration of predetermined parameters in the continuous operation of the bus system, the operating mode of the scheduling unit setting a predetermined mode of a communication on the bus.

At least two of the subscriber stations described above may be part of a bus system, which additionally comprises a bus, the at least two subscriber stations being connected to one another via the bus in such a way that they are able to communicate serially with one another.

The aforementioned objective is additionally achieved by a method for communicating in a serial bus system according to the present invention. In accordance with an example embodiment of the present invention, the method is carried out using a subscriber station of the bus system, which comprises a communication control device and a transmitting/receiving device, the method comprising the steps of controlling, using a communication control device, a communication of the subscriber station with at least one other subscriber station of the bus system, and transmitting, using a transmitting/receiving device, a transmission signal generated by the communication control device in a frame on a bus of the bus system according to the schedule of a scheduling unit, which schedules a temporal access of the subscriber station to the bus in at least one time slot of a cycle of temporally consecutive time slots, at least one time slot being provided in a cycle for each subscriber station of the bus for transmitting its transmission signal and the cycle repeating cyclically, and the scheduling unit determining, together with the other subscriber stations of the bus in the operation of the bus system using a priority of the transmission signal, which time slot of the cycle the transmitting/receiving device may use for transmitting the frame for the transmission signal on the bus.

The method offers the same advantages as were mentioned above with reference to the subscriber station.

Additional possible implementations of the present invention also include combinations of features or specific embodiments not explicitly mentioned above or below with regard to the exemplary embodiments. One skilled in the art will also add individual aspects as improvements or supplementations to the respective basic form of the present invention, in view of the disclosure herein.

BRIEF DESCRIPTION OF THE DRAWINGS

The present invention is described below in greater detail with reference to the figures and on the basis of exemplary embodiments.

Unless indicated otherwise, identical or functionally equivalent elements are provided with the same reference characters in the figures.

DETAILED DESCRIPTION OF EXAMPLE EMBODIMENTS

Figure 1:
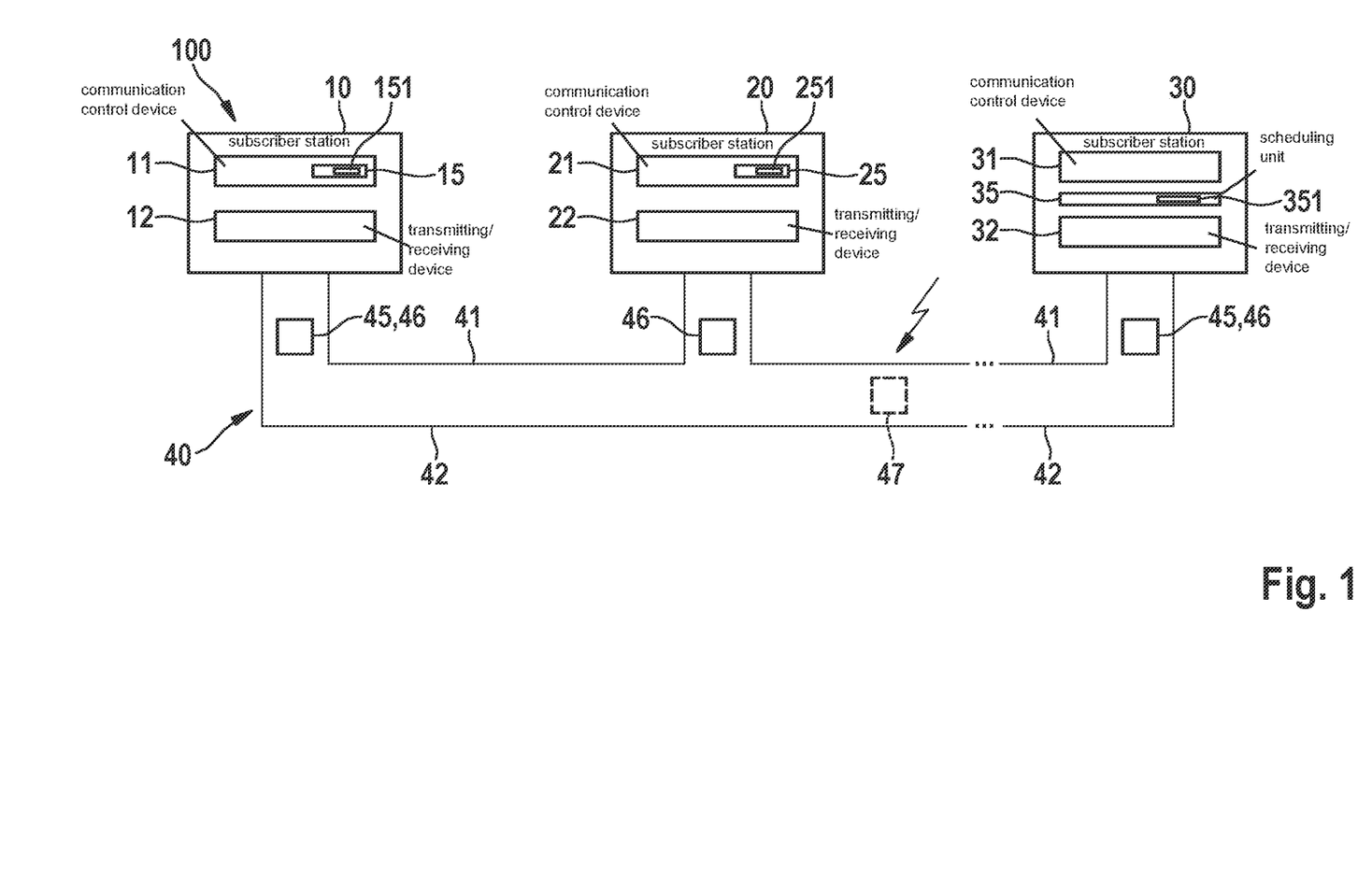
FIG. 1 shows a simplified block diagram of a bus system according to a first exemplary embodiment of the present invention.

FIG. 1 shows as an example a bus system 100, which is fundamentally developed in particular as a CAN bus system and/or a CAN FD bus system and/or a CAN FD successor bus system, which is here called a CAN XL bus system, and/or variants of the same, as described below. Bus system 100 may be used in a vehicle, in particular a motor vehicle, in an aircraft, etc., or in a hospital, etc.

In FIG. 1, bus system 100 has a plurality of subscriber stations 10, 20, 30, which are respectively connected to a bus 40 having a first bus wire 41 and a second bus wire 42. Bus wires 41, 42 may also be called CAN H and CAN L or CAN-XL H and CAN-XL L and are used for electrical signal transmission after coupling in the dominant levels or generating recessive levels for a signal in the transmission state. Messages 45, 46 are serially transmittable via bus 40 in the form of signals between the individual subscriber stations 10, 20, 30. If an error occurs in the communication on bus 40, as illustrated by the jagged black arrow in FIG. 1, an error frame (error flag) 47 may be optionally transmitted. Subscriber stations 10, 20, 30 are for example control units, sensors, display devices, etc. of a motor vehicle.

As shown in FIG. 1, subscriber station 10 has a communication control device 11, a transmitting/receiving device 12 and a scheduling unit 15 including a counting module 151. Subscriber station 20 has a communication control device 21, a transmitting/receiving device 22 and a scheduling unit 25 including a counting module 251. Subscriber station 30 has a communication control device 31, a transmitting/receiving device 32 and a scheduling unit 35 including a counting module 351. Transmitting/receiving devices 12, 22, 32 of subscriber stations 10, 20, 30 are each connected directly to bus 40, even if this is not illustrated in FIG. 1.

Communication control devices 11, 21, 31 are respectively used for controlling a communication of the respective subscriber station 10, 20, 30 via bus 40 with at least one other subscriber station of the subscriber stations 10, 20, 30 that are connected to bus 40.

Communication control devices 11, 31 generate and read first messages 45, which are CAN messages for example that are constructed on the basis of a CAN XL format, which is described in more detail with reference to FIG. 2. Communication control devices 11, 31 may be additionally designed to provide, as needed, a Can XL message 45 or a CAN FD message 46 for transmitting/receiving devices 12, 32 or to receive such from the latter. Communication control devices 11, 31 thus generate and read a first message 45 or a second message 46, the first and second messages 45, 46 being differentiated by their data transmission standard, namely, in this case CAN XL or CAN FD.

Communication control device 21 may be developed like a conventional CAN controller in accordance with ISO 11898-1:2015, in particular like a CAN FD-tolerant classical CAN controller or a CAN FD controller. Communication control device 21 generates and reads second messages 46, for example classical CAN messages or CAN FD messages 46. The CAN FD messages 46 may comprise a number from 0 to 64 data bytes, which additionally are transmitted at a markedly faster data rate than in the case of a classical CAN message. In particular, except for unit 25, communication control device 21 is developed like a conventional CAN or CAN FD controller.

Transmitting/receiving device 22 may be developed like a conventional CAN transceiver in accordance with ISO 11898-2:2016 or CAN FD transceiver. Transmitting/receiving devices 12, 32 may be designed to provide, as needed, messages 45 or bits of a frame in accordance with the CAN XL format or messages 46 or bits of a frame in accordance with the current CAN FD format for the associated communication control device 11, 31 or to receive such from the latter.

Using the two subscriber stations 10, 30, it is possible to generate and then transmit messages 45 in the CAN XL format and to receive such messages 45.

Figure 2:
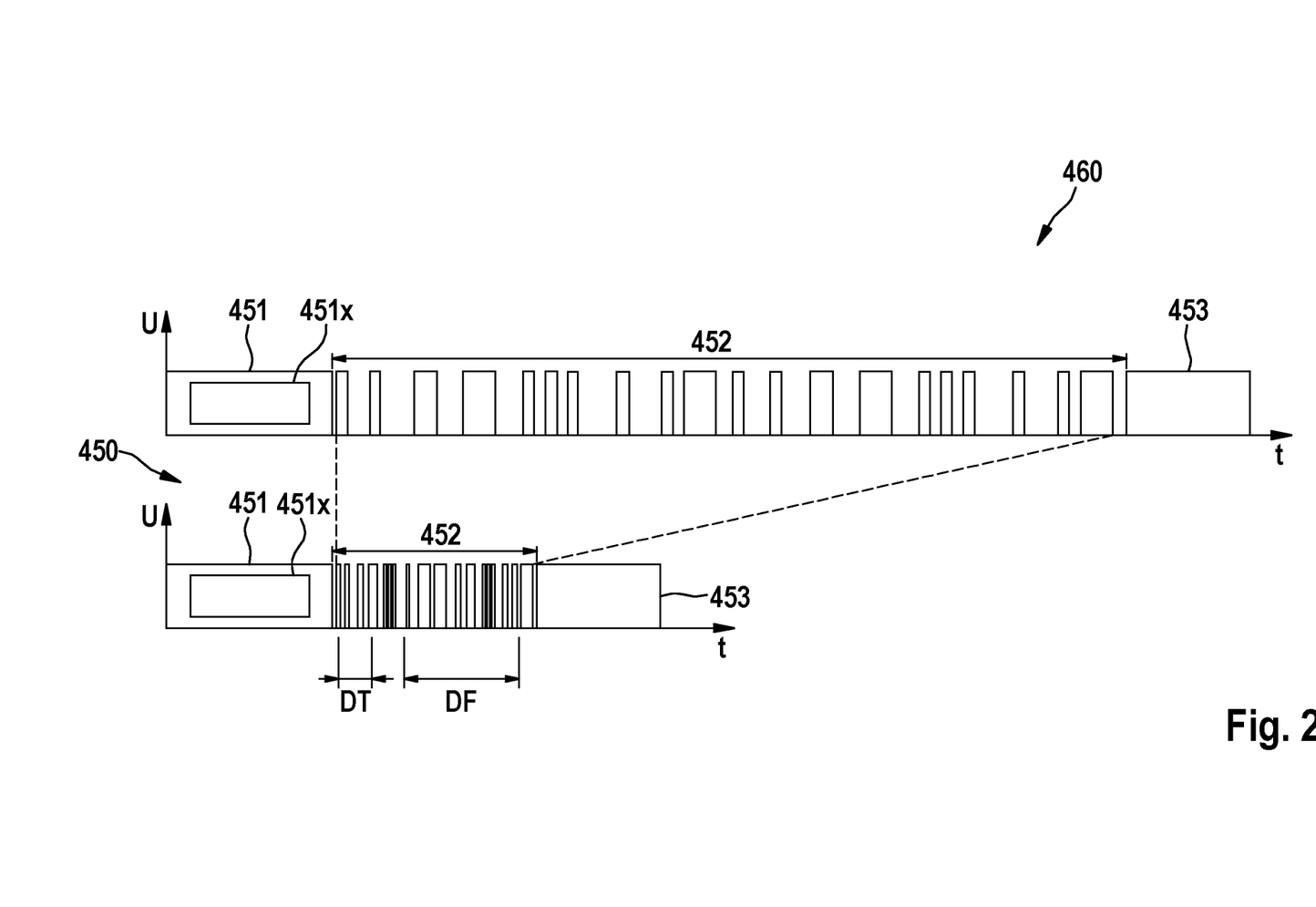
FIG. 2 shows a diagram illustrating the structure of messages that may be transmitted by subscriber stations of the bus system according to the first exemplary embodiment of the present invention.

FIG. 2 shows in its upper section for message 46 a CAN FD frame 460, as it is transmitted serially on bus 40 by transmitting/receiving device 12 or transmitting/receiving device 22 or transmitting/receiving device 32 over time t. The lower section of FIG. 2 shows for message 45 a special example of a CAN XL frame 450, as it may be transmitted serially on bus 40 by transmitting/receiving device 22 or 32 over time t. Alternatively, the upper section of FIG. 2 may be interpreted as a classical CAN frame and the lower section of FIG. 2 may be interpreted as a CAN FD frame or CAN XL frame.

According to FIG. 2, for the CAN communication on bus 40, frames 450, 460 are partitioned into different communication phases 451, 452, 453, namely, an arbitration phase 451, a data phase 452, and an end of frame phase 453. In the arbitration phase 451 at the start of frame 450, 460, the associated transmitting/receiving device 12, 22, 32 transmits an identifier 451x and a portion of a control field. In the data phase 452, the following data are transmitted inter alia: a portion of the control field, the user data of the CAN XL frame or of message 45, 46 in a data field DF and a checksum. In a frame 450, a portion of the control field may be an optional DataType field DT, which indicates the type of data that are transmitted in data field DF. For illustrative purposes, DataType field DT is shown in FIG. 2 having a greater length than it often has in relation to the length of the data field DF. DataType field DT may be transmitted in the control portion of the frame 450, 460, in particular at the start of data phase 452, or at the end of arbitration phase 451. Data phase 452 is followed by the end of frame phase 453, which also belongs to the arbitrations phase according to ISO11898-1:2015. End of frame phase 453, which may also be referred to as the arbitration phase at the end of frame 450, 460, has inter alia the following portions: an ACK field and an end of frame (EOF) indicator. The end of frame phase 453 is not relevant in this context and is therefore not described in more detail.

In the arbitration phase 451, the associated transmitting/receiving device 12, 22, 32 transmits bits of frame 450, 460 at a slower bit rate than in the data phase 452. In the case of CAN FD, the data phase 452 is temporally markedly shorter than the data phase 452 of the classical CAN frame. In particular application cases, the two bit rates of phases 451, 452 may be configured to the same values, but usually the bit rate in the data phase 452 is considerably higher than in the arbitration phase 451.

For CAN XL, a frame format is defined, in which not only the bit rates within frame 450 or message 45 are switched over, but optionally also the operating mode of transmitting/receiving device 12, 32. In the arbitration phase 451, transmitting/receiving device 12, 32 works in an operating mode (here called CAN) that is compatible to ISO 11898-2:2016. In the data phase 452 of frame 450, transmitting/receiving device 12, 32 may be optionally switched into another operating mode that allows for higher bit rates and thus a fast data transmission.

The arbitration phase 451 is used to negotiate with the aid of an identifier (ID) 451x bitwise between subscriber stations 10, 20, 30 to determine which subscriber station 10, 20, 30 has the message 45, 46 with the highest priority and hence receives exclusive access to bus 40 of bus system 100 for transmitting at least in the subsequent data phase 452. For this purpose, the conventional CSMA/CR method is applied in the arbitration phase 451, which allows for simultaneous access of subscriber stations 10, 20, 30 to bus 40, without the higher prioritized message 45, 46 being destroyed. This makes it possible in a relatively simple manner to add further bus subscriber stations 10, 20, 30 to bus system 100, which is very advantageous.

In the arbitration phase 451, the associated transmitting/receiving device 12, 22, 32 thus uses a physical layer as in the case of CAN and CAN FD. The physical layer corresponds to the bit transmission layer or layer 1 of the conventional OSI model (open systems interconnection model).

If scheduling units 15, 25, 35 are not activated, frames 450, 460 are generated and the bus access of the individual subscriber stations proceeds in an uncoordinated manner. Conflicts in the communication on bus 40 are resolved by an arbitration, as defined in ISO 11898-1:2015.

The CSMA/CR method has the consequence that there must be so-called recessive states on bus 40, which may be overwritten by other subscriber stations 10, 20, 30 having dominant states on bus 40. In the recessive state, highly resistive conditions prevail at the individual subscriber stations 10, 20, 30, which in combination with the parasites of the bus circuit entail longer time constants. This results in a limitation of the maximum bit rate of today's CAN FD physical layer to currently approximately 2 megabits per second in real vehicle usage.

A transmitter of message 45, 46 starts a transmission of bits of data phase 452 on bus 40 only when the corresponding subscriber station 10, 20, 30 as the transmitter won the arbitration and subscriber station 10, 20, 30 as transmitter thus has exclusive access to bus 40 of bus system 100 for transmitting.

Quite generally, in the bus system using CAN XL, the following deviating properties may be implemented in comparison to CAN or CAN FD:

a) take-over and, if indicated, adaptation of proven properties that are responsible for the robustness and user-friendliness of CAN and CAN FD, in particular the frame structure with identifier 451x and arbitration in accordance with the CSMA/CR method, b) increase of the net data transmission rate, in particular to approximately 10 megabits per second, c) increase of the size of the user data per frame, in particular to approximately 4 kbyte.

Figure 3:
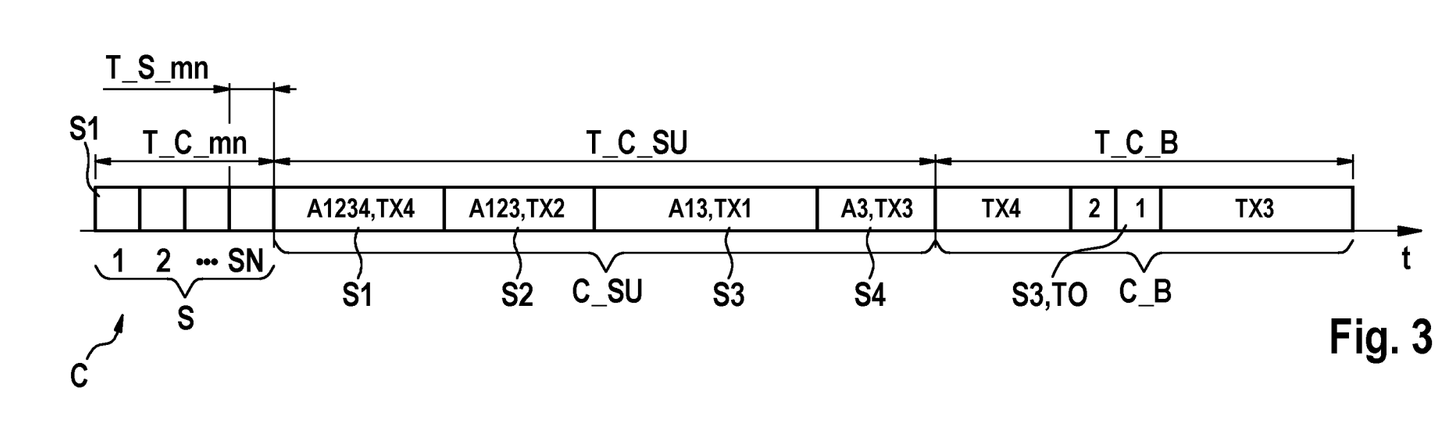
FIG. 3 shows a timing diagram illustrating the sequence of a communication in the bus system according to the first exemplary embodiment of the present invention.

FIG. 3 shows a case for a communication on bus 40, in which scheduling units 15, 25, 35 are activated. In this case, a deterministic bus access of each of the subscriber stations 10, 20, 30 is possible. For this purpose, a transmission cycle or cycle C is used in the communication on bus 40, in which in the simplest case one time slot S is available for each of subscriber stations 10, 20, 30. The number SN of time slots S thus corresponds to the number N of subscriber stations 10, 20, 30 on bus 40. The bandwidth on bus 40 is divided by the number N of subscriber stations 10, 20, 30.

In the example of FIG. 3, there are four time slots S, namely, time slots S1, S2, S3, S4, so that four arbitrary subscriber stations of subscriber stations 10, 20, 30 are present. The four arbitrary subscriber stations of subscriber stations 10, 20, 30 are thus referred to below as subscriber stations 1, 2, 3, 4.

Quite generally, SN time slots S may be provided, SN being an arbitrary natural number. The number of time slots S is constant, that is, it is the same in very cycle C.

Scheduling units 15, 25, 35 effect a generation of frames 450, 460 according to the following rules.

Each frame 450, 460 again starts with an arbitration phase 451. The identifier 451x may be chosen arbitrarily for each frame 450, 460, as long as the rule, customary in CAN, is observed, that each identifier 451x is used exclusively only by one of subscriber stations 1, 2, 3, 4.

The minimum time slot duration T_S_mn is at least one arbitration bit time, that is, as long as the bit time of a bit in arbitration phase 451. The maximum time slot duration T_S_mx is equal to the maximum length of a frame 460 or 450. The minimum cycle duration T_C_mn is thus equal to the sum of all minimum time slot durations T_S_mn. Moreover, the maximum cycle duration T_C_mx is equal to the sum of all maximum time slot durations T_S_mx.

Each subscriber station 1, 2, 3, 4 may transmit on bus 40 only in the time slot S1, S2, S3, S4 that is provided for the subscriber stations 1, 2, 3, 4. In the present exemplary embodiment, each subscriber station 1, 2, 3, 4 may transmit a single frame 450, 460 on bus 40 in the time slot S1, S2, S3, S4 provided for it.

In its time slot S1, S2, S3, S4, each of the subscriber stations 1, 2, 3, 4 respectively has one transmit opportunity TO. Thus, the subscriber station 1, 2, 3, 4 may transmit a frame 450, 460 in the time slot S1, S2, S3, S4 assigned to it, or it may let the opportunity for transmission elapse. Following a minimum time slot duration T_S_mn, the transmit opportunity TO has elapsed.

In the example of FIG. 3, the minimum cycle duration T_C_mn is four arbitration bit times, because 4 time slots S1, S2, S3, S4 are available for the four subscriber stations 1, 2, 3, 4. The minimum time slot duration T_S_mn is assumed as 1 arbitration bit time.

The following basic assumptions apply to the present exemplary embodiment. In the first cycle C, that is, after the bus system 100 is switched on, time slots S1, S2, S3, S4 are assigned to the individual subscriber stations 1, 2, 3, 4. The assignment occurs dynamically via the frame Ids or identifiers 451x, which subscriber stations 1, 2, 3, 4 use for transmitting their first frame 450, 460. The transmission order is determined by the arbitration, which corresponds to the assignment of time slots S1, S2, S3, S4 to the subscriber stations 1, 2, 3, 4.

If subscriber stations 1, 2, 3, 4 are not switched on simultaneously, the assignment of time slots S1, S2, S3, S4 is completed only when the last subscriber station 1, 2, 3, 4 has been switched on and when every subscriber station 1, 2, 3, 4 has transmitted a frame 450, 460. The assignment of time slots S1, S2, S3, S4 to subscriber stations 1, 2, 3, 4 is maintained in the subsequent cycles C. That is, there is no new arbitration and the transmission order remains unchanged. If one or several of the subscriber stations 1, 2, 3, 4 go to sleep and wake up again, a reintegration is performed, which requires again an arbitration. This will be described in more detail later with reference to FIG. 4.

FIG. 3 shows a start cycle C_SU, in which in a time duration T_C_SU, the assignment of time slots S1, S2, S3, S4 to subscriber stations 1, 2, 3, 4 is determined. For the sake of simplicity, it is assumed in the example of FIG. 3 that all subscriber stations 1, 2, 3, 4 want to transmit right at the start of a frame 450, 460.

In time slot S1, all subscriber stations 1, 2, 3, 4 start a frame simultaneously and participate in the bus arbitration, as illustrated by A1234 in FIG. 3. Subscriber station 4 wins the arbitration A and transmits its frame. This is illustrated in FIG. 3 by TX4, TX4 standing for the transmission signal TX of subscriber station 4 and the frame being based on transmission signal TX4. Time slot S1 is thereby assigned to subscriber station 4.

In time slot S2, subscriber stations 1, 2, 3 start a frame simultaneously and participate in the bus arbitration, as illustrated by A123 in FIG. 3. Subscriber station 2 wins the arbitration and transmits its frame. This is illustrated by TX2 in FIG. 3. Time slot S2 is thereby assigned to subscriber station 2.

For time slot S3, an arbitration is performed between subscriber stations 1, 3, as described above. Finally, in the example of FIG. 3, time slot S3 is assigned to subscriber station 1.

Time slot S4 is assigned to subscriber station 3. An arbitration is no longer performed because the other subscriber stations 1, 2, 4 do not transmit anything in time slot S4.

Hence, the TX transmission order is specified by the arbitration hereinafter as TX_4_2_1_3.

Subsequently, a normal operation of bus system 100 can begin. A possible cycle C in the operation could be a cycle C_B, which is illustrated in FIG. 3 in the right section of the figure. In the cycle C_B, the TX transmission order continues to be specified without change as TX_4_2_1_3. Subscriber stations 3, 4 transmit in cycle C_B. Subscriber stations 1, 2, on the other hand, do not transmit. Subscriber stations 3, 4 thus make use of their transmit opportunity TO. Transmit stations 1, 2, however, let their transmit opportunity TO elapse. This yields an average cycle duration T_C_B. The maximum cycle duration T_C_mx results when in every time slot S1 through S4 the associated subscriber station 1, 2, 3, 4 transmits a frame 450, 460 of the maximum length. The number 1 in time slot S3 indicates that this time slot is assigned to subscriber station 1. The number 2 in time slot S2 indicates that this time slot is assigned to subscriber station 2. This similarly applies to time slots S1 and S4 and subscriber stations 3, 4.

For implementing the above-described scheduling for a transmission of frames 450, 460 on bus 40, each of the scheduling units 15, 25, 35 is constructed as described below.

Each subscriber station 1, 2, 3, 4 on bus 40 knows the number SN of time slots S1, S2, S3, S4 per cycle C. In the simplest case, the number of subscriber stations 1, 2, 3, 4 on bus 40 corresponds to the number of time slots S1, S2, S3, S4 per cycle C, so that this yields a 1-1 association of time slots and subscriber stations. The number SN of time slots S1, S2, S3, S4 per cycle C is stored in scheduling units 15, 25, 35.

The normal operation for a subscriber station 1, 2, 3, 4 starts as soon as the subscriber station 1, 2, 3, 4 has transmitted its first frame 450, 460. After the frame 450, 460 has been transmitted, counting module 151, 251, 351 of scheduling units 15, 25, 35 sets its count value Scnt to 1. From now on, counting module 151, 251, 351, using at least one counter, counts the number of received frames 450, 460 on bus 40 and the number of elapsed transmit opportunities TO. For this purpose, counting module 151, 251, 351 counts per received frame 450, 460 and elapsed transmit opportunity TO, so that the count value Scnt of the at least one counter is respectively incremented by 1 and thus Scnt:=Scnt+1.

As soon as the start of frame bit of a frame 450, 460 is transmitted on bus 40, counting module 151, 251, 351 counts the frame 450, 460 as a transmitted frame 450, 460 on bus 40. This also holds true if the transmission is aborted by the transmitter, for example by an error frame 47 due to an error.

If in counting module 151, 251, 351 for the count value Scnt==SN, the next time slot is its own time slot. In the case of the count value Scnt==SN, the subscriber station 1, 2, 3, 4 thus has its own transmit opportunity TO in the next time slot. Now the respective subscriber station 1, 2, 3, 4 is able to transmit a frame 450, 460 or let the transmit opportunity TO elapse.

Even when subscriber station 1, 2, 3, 4 lets its transmit opportunity TO elapse, the associated counting module 151, 251, 351 of the subscriber station 1, 2, 3, 4 nevertheless sets its count value Scnt:=1.

Moreover, the counting module 151, 251, 351 of a subscriber station 1, 2, 3, 4 sets its count value to Scnt:=1 only when the subscriber station 1, 2, 3, 4 was able to transmit its frame or has let its transmit opportunity TO elapse. This is necessary when the transmission order on bus 40 is assigned anew and another arbitration ensues as a result. This may be the case if one of the subscriber stations 1, 2, 3, 4 was woken up again and it then wants to participate again in the bus communication. This is described in more detail below with reference to FIG. 4.

After having been switched on or woken up, the subscriber stations 1, 2, 3, 4 do not know which of the time slots S1, S2, S3, S4 per cycle C is assigned to the respective subscriber station 1, 2, 3, 4.

Figure 4:
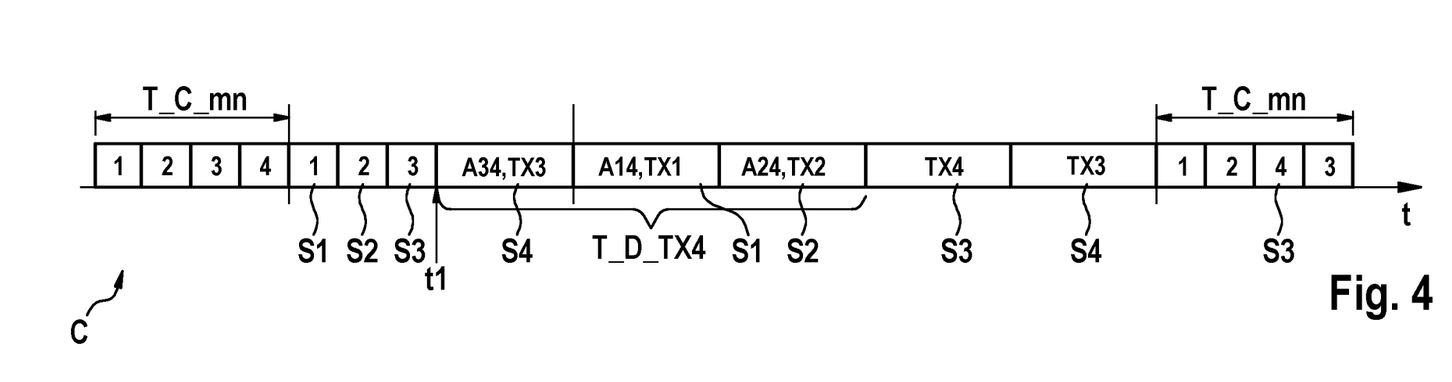
FIG. 4 shows a timing diagram illustrating the sequence of a communication in the bus system according to the first exemplary embodiment of the present invention, after a subscriber station was woken up again.

FIG. 4 shows the case in which subscriber station 3 was initially asleep and was then woken up again. At time t1, for example, subscriber station 3 in FIG. 4 has woken up again and is ready to transmit. Up until this point in time and thus also up until the point in time before subscriber station 3 was put to sleep, the transmission order was determined as TX_1_2_3_4, as shown on the left side in FIG. 4 by the numbers in the time slots. Since subscriber station 3 has lost its synchronization with the time slot number, subscriber station 3 attempts to transmit for example a frame 450 at the next opportunity, that is, when bus 40 is free. Coincidentally, in the example of FIG. 4, subscriber station 3 attempts to transmit the first frame 450 precisely at the time t1, when its actual transmit opportunity TO in time slot S3 has elapsed.

The frame 450 of subscriber station 3 results in an arbitration on bus 40 if the current time slot, time slot S4 in the example shown, is already assigned to another of the subscriber stations 1, 2, 4 and this subscriber station 1, 2, 4 also starts a frame 450, 460 in the current time slot. In the example of FIG. 4, an arbitration therefore occurs between the frames 450, 460 of subscriber stations 3, 4, as illustrated by A34 in FIG. 4. The newly started subscriber station 3 thus attempts literally to insert itself into the communication.

If the frame 450 of subscriber station 3 loses the arbitration, subscriber station 3 repeats the transmission of frame 450 until the subscriber station 3 has won the arbitration and is able to transmit its frame 450 or, after winning the arbitration, aborts due to an error. Subsequently, the counting module 151, 251, 351 of subscriber station 3 sets its count value Scnt:=1 and thus begins again at the start of the count.

In the example of FIG. 4, frame 450 of subscriber station 3 won the arbitration in time slot S4. Subscriber station 3 thus took over time slot S4 from subscriber station 4. In other words, subscriber station 4 wanted to transmit one of frames 450, 460, but lost the arbitration on bus 40. Subscriber station 4 thus had its time slot S4 just taken away by another one of the subscriber stations. In the example of FIG. 4, this is the subscriber station 3, which was started anew and took away the time slot from subscriber station 4.

For this reason, the frame of subscriber station 4 must now arbitrate with the frame of subscriber station 1 in the subsequent time slot S1. Since the frame of subscriber station 1 wins the arbitration here, the frame of subscriber station 4 must arbitrate in time slot S2 with the frame of subscriber station 2. Ultimately, subscriber station 4 is able to transmit its transmission signal TX4 or the associated frame 450, 460 not until time slot S3, which previously was assigned to subscriber station 3. The transmission of transmission signal TX4 is thus delayed by the time duration T_D_TX4.

Accordingly, in the example of FIG. 4, or depending on the result of the arbitration, the assignment of time slots S1, S2, S3, S4 is distributed anew. Thus, in the example of FIG. 4, the previous transmission order is no longer specified as TX_1_2_3_4, but is changed to TX_1_2_4_3. In this example, subscriber stations 3, 4 have swapped their assigned time slots S3, S4, as shown on the right in FIG. 4 by the numbers in the time slots.

This new transmission or time slot assignment has the result that the delay in time in the worst case (worst case delay) becomes longer for the bus access of subscriber station 4 than the maximum cycle duration T_C_mx. In the worst case, the delay is longer by SN−1 maximum frame lengths than the maximum cycle duration T_C_mx, i.e., here longer by SN−1=4−1=3. The worst case delay for the bus access of a subscriber station 1, 2, 3, 4 is thus S+S−1=2S−1 maximum frame lengths. This is comparable to the PLCA of 10BASE-T1S, which has approximately the same value.

One advantage of this exemplary embodiment is that the communication on bus 40 through the arbitration is self-organizing. Hence, no master node is required to organize the communication. Because there exists no master node, there is also no "single point of failure", which could cause the communication on bus 40 to come to a halt.

A further advantage of this exemplary embodiment is that in the configuration of bus system 100, only a single parameter needs to be entered, namely, the parameter SN, which is equal to the number N of the subscriber stations on bus 40. The configuration thus requires very little expenditure.

Figure 5:
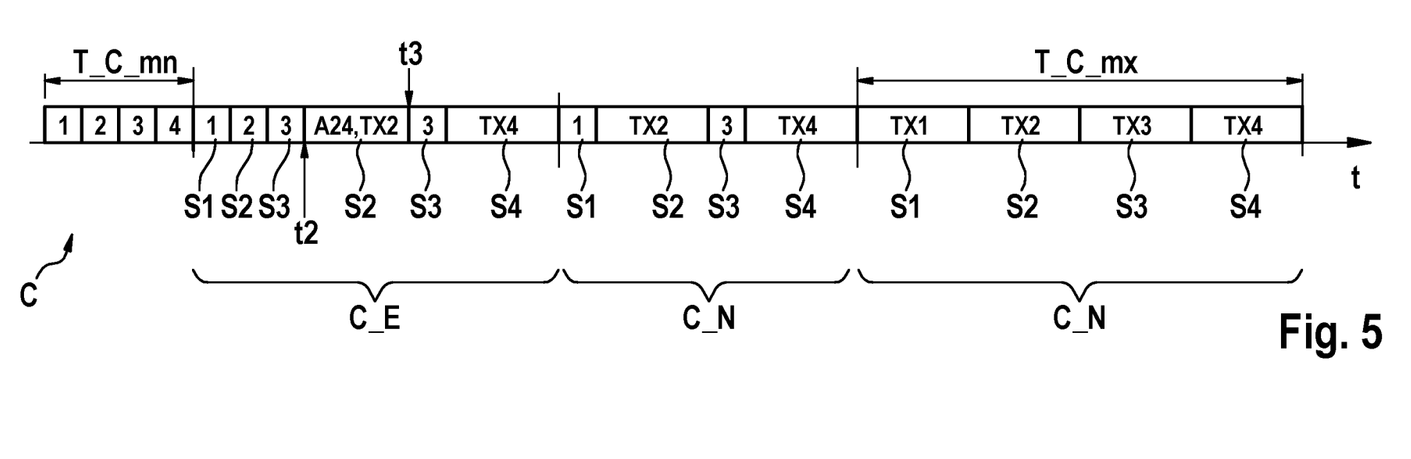
FIG. 5 shows a timing diagram illustrating the sequence of a communication in a bus system according to a second exemplary embodiment of the present invention.

FIG. 5 shows a time sequence in bus system 100 for illustrating a communication according to a second exemplary embodiment. For this purpose, FIG. 5 shows a cycle when switching on a subscriber station 1, 2, 3, 4, that is, a switch-on cycle C_E, and a subsequent normal operation with normal cycles C_N.

In contrast to the time sequence of the communication according to the above-described exemplary embodiment, in the present exemplary embodiment it is also possible that, after being switched on or woken up, a subscriber station 1, 2, 3, 4 is more quickly synchronized to the time slot number than in the above-described exemplary embodiment. This is achieved with the aid of a subscriber station number, which is transmitted as information in frame 450, 460. It may thus be seen on bus 40 or by evaluating the frame received from bus 40, which subscriber station 1, 2, 3, 4 of bus 40 is currently transmitting. Consequently, it is known indirectly which number the current time slot has. To this end, the following procedure is followed in the present exemplary embodiment.

Every subscriber station 1, 2, 3, 4 on bus 40 or, more precisely, every scheduling unit 151, 251, 351 knows the number SN of time slots S1, S2, S3, S4 per cycle C. The number SN may be entered as parameter SN in the configuration of bus system 100 in the respective scheduling unit 151, 251, 351. In the simplest case, the number N of subscriber stations 1, 2, 3, 4 on bus 40 corresponds to the number SN of time slots S1, S2, S3, S4 per cycle C, so that the 1-1 association is again given.

Furthermore, every subscriber station 1, 2, 3, 4 knows the subscriber station numbers of the other subscriber stations 1, 2, 3, 4. In the simplest case, the subscriber station number is used as frame identifier 451x (frame ID), which is transmitted at the beginning of each frame 450, 460. Every subscriber station 1, 2, 3, 4 thus knows which time slot S1 through S4 belongs to which subscriber station 1, 2, 3, 4. Ideally, every subscriber station 1, 2, 3, 4 additionally transmits all its frames 450, 460 with the same frame identifier 451*x*.

If for example SN=10 time slots S1 through S10 and thus also subscriber stations 1 through 10 are present on bus 40, the frame identifier 451*x* and thus the subscriber station number of subscriber station 1 may be the 0×01, that of subscriber station 2 may be the 0×02, etc., and that of subscriber station 10 the 0×0A. In a simple assignment of subscriber stations to time slots, subscriber station 1 transmits in time slot S1, subscriber station 2 transmits in time slot S2, etc., and subscriber station 10 transmits in time slot S10. The assignment of subscriber stations 1 through 10 to time slots S1 through S10 thus involves very little expenditure. It is of course also possible, however, to specify the transmission order, which corresponds to the assignment of time slot number to subscriber station number, as desired.

SN=4 time slots and N=4 subscriber stations are again assumed in the following.

After being switched on, every subscriber station 1, 2, 3, 4 must observe the communication on bus 40 for a certain time. Here, the following two cases must be distinguished, which are described below.

In the first case A1, subscriber station 1 for example receives a valid frame 450, 460. Subscriber station 1 knows the current time slot number from the subscriber station number in the received frame 450, 460, which is indicated for example via the frame identifier 451*x*. Subscriber station 1 is thus synchronized to time slots S1 through S4 and transitions into normal operation.

In the second case A2, subscriber station 1, 2, 3, 4 does not receive a frame 450, 460, because the bus is idle at the moment, as may be seen in FIG. 5 on the left from the many unused transmit opportunities TO for time slots S1 through S4 from time t2 onward.

If SN time slots of minimal duration have elapsed, without subscriber station 2, for example, having received a frame 450, 460 after having been switched on, then none of the subscriber stations 1, 2, 3, 4 has so far transmitted in this switch-on cycle C_E. In the example of FIG. 5, the predetermined waiting time for the newly switched-on subscriber station 2 has a time duration T_C_mn. The time duration T_C_mn corresponds to SN=4 time slots of elapsed transmit opportunity TO.

For this reason, subscriber station 2 is simply able to transmit its frame 450, 460 at time t2. Subscriber station 2 thus transmits most probably in a time slot that is assigned to another one of the subscriber stations 1, 3, 4. This is no problem, however. For, due to the long preceding idle phase on bus 40, which corresponds to many elapsed transmit opportunities TO, the delay for the bus access in the worst case does not increase. If multiple subscriber stations 1, 2, 3, 4 simultaneously start a transmission in a time slot S1, S2, S3, S4 and an arbitration thereby occurs on bus 40, then the frame that won the arbitration defines the time slot number anew.

According to the example of FIG. 5, a predetermined waiting time, which corresponds to a minimum cycle duration T_C_mn, has elapsed for subscriber station 2. Subscriber station 2 is therefore now allowed to transmit. The time slot beginning at time t2 in switch-on cycle C_E is actually assigned to subscriber station 4. This results in the case where subscriber station 2 and subscriber station 4 in the example of FIG. 5 start to transmit a frame in the time slot after time t2. This is illustrated in FIG. 5 as A24, TX2.

The frames of subscriber stations 2, 4 thus participate in the bus arbitration. In the example of FIG. 5, subscriber station 2 prevails, since subscriber station 2 has an identifier 451*x* of a higher priority in the frame.

Due to the transmitted frame 450, 460 after time t2, the respective scheduling unit 151, 251, 351 of subscriber stations 1, 2, 3, 4 changes the previous time slot number S4 for all subscriber stations 1, 2, 3, 4 to the number to which the transmitted frame is entitled. The time slot after time slot S3 or after t2 is thus numbered anew as time slot S2, as indicated in FIG. 5.

Thereupon, that is, at or beginning with time t3, all subscriber stations 1, 2, 3, 4 know the current time slot number, which is here S3.

In normal operation, that is, during cycles C_N, a subscriber station 1, 2, 3, 4 is synchronized to the time slot numbers. In order to find its own time slot S1, S2, S3, S4, each subscriber station 1, 2, 3, 4 uses its counting module 151, 251, 351, as described with reference to the preceding exemplary embodiment. The counting module 151, 251, 351 is necessary in particular because some subscriber stations 1, 2, 3, 4, like for example subscriber station 3 in its time slot S3, possibly let their transmit opportunity TO elapse because a sensor as subscriber station 3 currently records no data or does not have to transmit so many data. This is illustrated in FIG. 5 at the center. The right portion of FIG. 5 by contrast shows a normal cycle C_N of maximum duration T_C_mx. With the aid of counting module 151, 251, 351, it is now nevertheless known to every subscriber station 1, 2, 3, 4, which time slot or which time slot number is concerned. As a result, all subscriber stations 1, 2, 3, 4 of bus system 100 remain synchronized to time slots S1, S2, S3, S4 or to the time slot numbers.

The one-time reception of a frame 450, 460 suffices to ensure that the scheduling unit 15, 25, 35 of the respective subscriber stations 1, 2, 3, 4 is always ready to transmit a frame intended for the subscriber station 1, 2, 3, 4 in a time slot S1, S2, S3, S4. After SN time slots, that is, after a minimum cycle duration T_C_mn, without frame 450, 460, scheduling unit 15, 25, 35 of the respective subscriber stations 1, 2, 3, 4 is nevertheless ready to transmit. In this case, scheduling unit 15, 25, 35 of the respective subscriber stations is able simply to transmit its frame 450, 460.

According to a modification of the embodiment described earlier, it is possible to transmit the subscriber station number at least one other position in frame 450, 460. For example, the subscriber station number may be transmitted in the data phase 452, in particular in data field DF, for example at the beginning of data field DF, or with the data type field (DataType field) DT, which is transmitted in a control section of the frame 450, 460, in particular at the beginning of data phase 452 or at the end of arbitration phase 451. The data type field indicates the type of data that are transmitted in data field DF.

Thus, at least one of the scheduling units 15, 25, 35 of the subscriber stations 1, 2, 3, 4 is designed, by using at least one item of information received from bus 40, to determine an assignment that specifies which time slot of the cycle C the transmitting/receiving device 12, 22, 32 may use for transmitting a frame for a transmission signal on bus 40. In the second exemplary embodiment and its modification, this item of information is the subscriber station number.

In the second exemplary embodiment and its modification, the subscriber station number is thus predetermined by the system integrator or by the configurator of bus system 100. The order of the communication on bus 40 is therefore no longer self-organizing, but rather it is predetermined, namely, via the assignment of the subscriber station number. The subscriber stations may then transmit only in a specified order, e.g., in the ascending order of the subscriber station number.

In the second exemplary embodiment and its modification, it is very advantageous, however, that a subscriber station that is switched on again is synchronized to time slot numbers S1, S2, S3, S4 existing in the communication on bus 40 more quickly than in the first exemplary embodiment. The worst case delay for the bus access of a subscriber station 1, 2, 3, 4 is thus only SN maximum frame lengths both in operation as well as when being switched on. The delay is thus only half as long as in the above-described exemplary embodiment. This variant of an embodiment is also more robust with respect to the counting of the time slots since the time slot number may be seen on the bus. The first and the second variant of an embodiment have in particular the following advantage. If, due to an error in one of the scheduling units 15, 25, 35, a subscriber station transmits in the wrong time slot, then this merely results in an arbitration and in a possible delay of the transmission. Such an error, however, cannot result in the destruction of the two frames on the bus.

Figure 6:
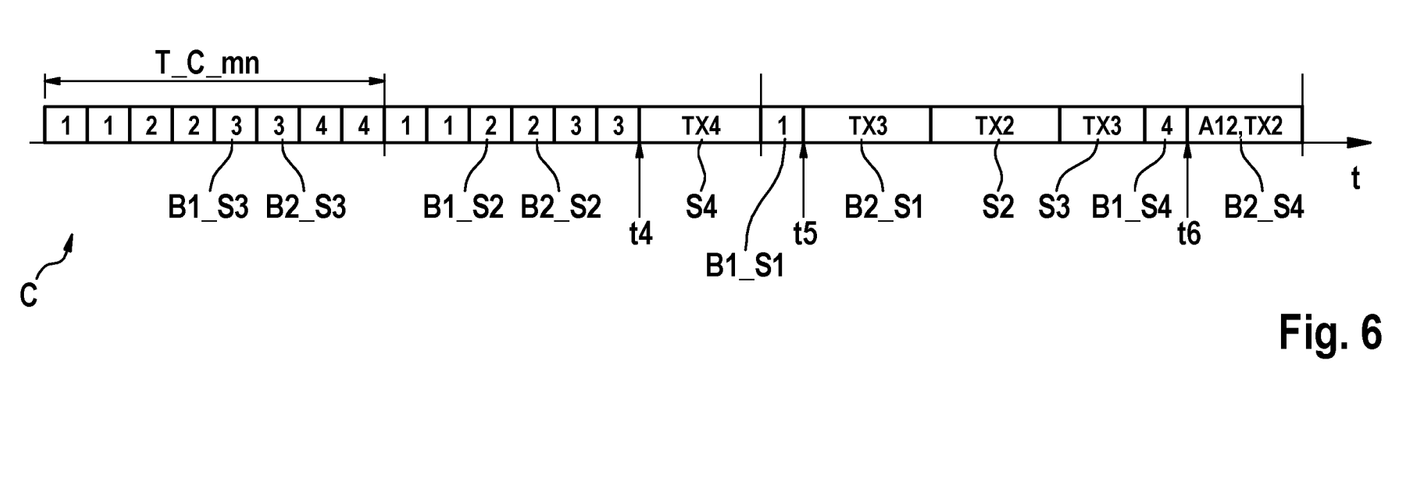
FIG. 6 shows a timing diagram illustrating the sequence of a communication in a bus system according to a third exemplary embodiment of the present invention.

FIG. 6 shows a time sequence in bus system 100 for illustrating a communication according to a third exemplary embodiment. For this purpose, FIG. 6 shows in its left section a cycle having a minimum cycle time duration T_C_mn, in which all time slots S1 through S4 respectively have at least two arbitration bit times. For example, time slot S3 has a first bit time B1_S3 and a second bit time B2_S3. The same is true for the other time slots S1, S2, S4.

A subscriber station 1, 2, 3, 4, which has its transmit opportunity TO in a time slot S1, S2, S3, S4, must start its frame in the first bit of the time slot S1, S2, S3, S4 assigned to it, in order to be guaranteed to be able to transmit a frame. Thus, no bit elapses in time slot S1, S2, S3, S4. If a subscriber station 1, 2, 3, 4 lets the first bit of its time slot S1, S2, S3, S4 elapse, then the subscriber station 1, 2, 3, 4 has also let its transmit opportunity TO elapse, which would have guaranteed the subscriber station 1, 2, 3, 4 the transmission of a frame. Thus, subscriber station 1, 2, 3, 4 currently does not want to transmit a frame.

Consequently, another subscriber station 1, 2, 3, 4 is now able to use this time slot S1, S2, S3, S4 for transmission. It is possible, however, that for example the subscriber station 1 lets its first bit time B1_S1 of its time slot S1 elapse, but then actually begins to transmit a frame in the second bit time B2_S1 of its time slot S1. In this example, it is thus possible for all subscriber stations 1, 2, 3, 4 to start a frame in the second bit time B2_S1 of time slot S1. The frames may also "fight" over this free time slot S1, that is, arbitrate on bus 40. In order for the frame having the highest priority to win the arbitration, subscriber stations 1, 2, 3, 4 may use identifiers 451x for their frames that begin in the second bit of a time slot, which match the priority of the frame. The arbitration ensures that the frame of the highest priority prevails.

This development of the minimum duration T_S_mn of time slots S1 through S4 makes it possible for one of the subscriber stations 1, 2, 3, 4 to use the transmit opportunity TO of another subscriber station, because it is clear from a first bit time that elapsed unused that the respective subscriber station has not used its guaranteed transmit opportunity TO.

In the example of FIG. 6, subscriber station 4 uses the fourth time slot S4 that is assigned to it for transmitting the transmission signal TX4 in a frame. At a t4 during time slot S4, subscriber station 3 is ready to transmit a frame. Since subscriber station 1 does not transmit a frame—the first bit time B1_S1 elapsing unused—starting at time t5, subscriber station 3 transmits the transmission signal TX3 as a frame in the second bit time B2_S1 of time slot S1. The second and third time slots S2, S3 are respectively used by the associated subscriber stations 2, 3. transmission signals TX2, TX3 are thus respectively transmitted in a frame on bus 40. Since subscriber station 4 does not transmit a frame—the first bit time B1_S4 elapsing unused—subscriber stations 1, 2 transmit frames on bus 40 starting at time t6. In the subsequent arbitration, subscriber station 2 prevails, so that transmission signal TX2 is transmitted as a frame on bus 40 in time slot S4.

One advantage of the present exemplary embodiment is that it is possible to mix a deterministic allocation of the communication bandwidth with a best effort data traffic. The best effort data traffic only comes about if some subscriber stations 1, 2, 3, 4 do not use the bandwidth, that is, the transmission slot S1, S2, S3, S4, allocated to them.

Another great advantage of the present exemplary embodiment is that the worst case delay for the bus access increases thereby only minimally. It becomes longer because the minimum time slot duration T_S_mn becomes longer.

In principle, the minimum time slot duration T_S_mn may alternatively have a length of three or more arbitration bit times. Subscriber stations 1, 2, 3, 4 on bus 40 may then be divided into different priority classes. The lower the priority class of a subscriber station 1, 2, 3, 4, the later the subscriber station 1, 2, 3, 4 may start a transmission within a time slot that remains free.

According to a modification of the present exemplary embodiment, the development having at least two bit times may be used so that subscriber stations 1, 2, 3, 4, after waking up or being switched on, are reintegrated in such a way that a transmitting subscriber station 1, 2, 3, 4 is not disadvantaged in that the time slot S1, S2, S3, S4 assigned to it is taken away from the transmitting subscriber station 1, 2, 3, 4. For this purpose, preferably every subscriber station 1, 2, 3, 4 uses for reintegration only time slots S1, S2, S3, S4 that were not used in the first bit by the actual time slot owner. If the reintegrating subscriber station of the subscriber stations 1, 2, 3, 4 transmits its frame starting with the second bit of time slot S1, S2, S3, S4 and if it wins the arbitration and is able to transmit the frame successfully, that is, error-free, then the time slot is subsequently assigned to it.

Figure 7:
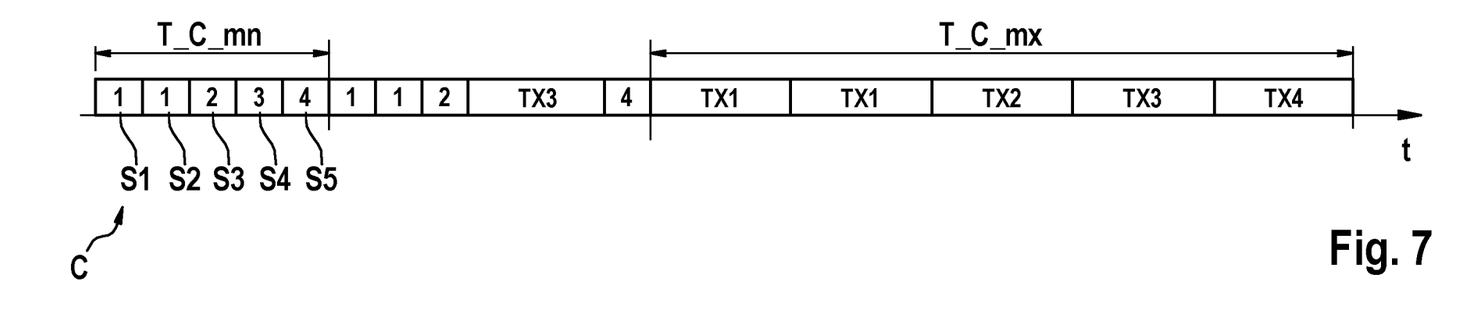
FIG. 7 shows a timing diagram illustrating the sequence of a communication in a bus system according to a fourth exemplary embodiment of the present invention.

FIG. 7 shows a time sequence in bus system 100 for illustrating a communication according to a fourth exemplary embodiment.

In contrast to the preceding exemplary embodiments, in the present exemplary embodiment, the communication bandwidth on bus 40 is not uniformly distributed between subscriber stations 1, 2, 3, 4. Instead, in the present exemplary embodiment, a so-called WRR method (weighted round robin method) is used. In the process, each subscriber station 1, 2, 3, 4 obtains a further parameter W (weight), which is adjustable in the associated scheduling unit 15, 25, 35 during the configuration. The parameter W indicates the number of frames 450, 460, which the subscriber station 1, 2, 3, 4 may transmit per cycle. W time slots are provided for one subscriber station 1, 2, 3, 4. For this reason, the parameter SN set in all subscriber stations 1, 2, 3, 4 now no longer corresponds to the number of subscriber stations 1, 2, 3, 4, but rather to the sum of all values of parameter W.

FIG. 7 shows an example with four subscriber stations 1, 2, 3, 4, in which the parameter W=2 is set for subscriber station 1. For the other subscriber stations 2, 3, 4, however, a parameter W=1 is respectively set. The number SN of time slots thus computes as SN=2+1+1+1=5. Consequently, a cycle C has a number of 5 time slots, namely, S1, S2, S3, S4, S5. In this case, subscriber station 1 is able to transmit two frames 450, 460 per round, namely, in time slots S1 and S2. The other subscriber stations 2, 3, 4 are each able to transmit only one frame 450, 460 per cycle C.

Figure 8:
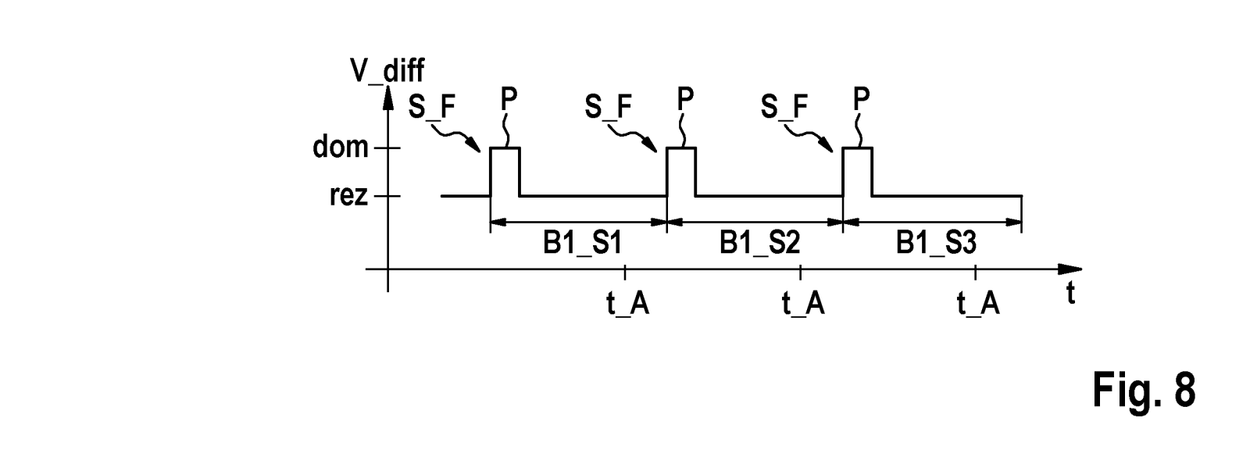
FIG. 8 shows a time characteristic of a differential bus signal in unused time slots in a bus system according to a fifth exemplary embodiment of the present invention.

For explaining a fifth exemplary embodiment, FIG. 8 shows a differential voltage V-diff, which is computed from the difference of bus signals CAN H and CAN L on bus 40.

According to FIG. 8, a subscriber station 1, 2, 3, which is not using its transmit opportunity TO, transmits a short dominant pulse at the beginning of bits B1-S1, B1_S2, B1_S3, etc., in its time slot S1, S2, S3. In the example of FIG. 8, only one bit, namely, the bit B1, is transmitted in each time slot S1, S2, S3, since the minimum time slot duration T_S_mn is assumed here to be an arbitration bit time. The bits are scanned by the receiving subscriber stations 1, 2, 3 at a scanning time t_A. If the minimum duration T_S_mn of a time slot corresponds to multiple arbitration bit times, then the subscriber station, to which the time slot is assigned, is able to transmit a dominant pulse P at the beginning of each bit if the subscriber station lets its transmit opportunity TO elapse.

In this case, the associated subscriber station 1, 2, 3 transmits a dominant pulse P of e.g. 200 ns in the recessive bits of its time slot S1, S2, S3. All CAN subscriber stations 1, 2, 3 synchronize to the recessive-dominant edge S_F of the dominant pulse P. Since the arbitration bit time is limited to 1000 ns or 1 Mbit/s in accordance with the aforementioned specification, a corresponding pulse P of 200 ns is not limiting. All subscriber stations 1, 2, 3 scan the actually recessive bit B1 as recessive in spite of the dominant pulse P, because at scanning time t_A, the pulse P has already ended long ago.

This makes it possible that subscriber stations 1, 2, 3 do not lose the synchronization to time slots S1, S2, S3, even if long idle phases occur in the communication on bus 40, in which all subscriber stations 1, 2, 3 do not use their transmit opportunities TO. By way of the dominant pulses P, subscriber stations 1, 2, 3 may be kept synchronized.

Bus system 100 is thus able to handle clock pulses that have relatively high tolerances. In this case, subscriber stations 1, 2, 3 synchronize to recessive-dominant edges on bus 40.

According to a sixth exemplary embodiment, it is possible that one or multiple subscriber stations 1, 2, 3, 4 of the preceding exemplary embodiments transmit multiple frames per time slot S1, S2, S3, S4. This development is advantageous for example in order to distribute the communication bandwidth on bus 40 more fairly, when for example subscriber station 1 typically transmits short frames 460 and subscriber station 2 typically transmits long frames 450. If each subscriber station 1, 2 is always only able to transmit one frame in the time slot S1, S2 assigned to it, then subscriber station 1 has less bandwidth than subscriber station 2 in the method according to the first and second exemplary embodiments.

In order to achieve greater fairness with regard to the communication bandwidth than in the first and second exemplary embodiments, subscriber station 1 is for example permitted to transmit multiple short frames 450 during its time slot S1. In order to remain fair, frames 450 in sum total should not be longer than a frame 450 of maximum length.

The fact that an additional frame 460 is transmitted by subscriber station 1 in this transmit opportunity TO may be signaled in the following ways.

For example, an identifier 451x may be used for this purpose. In this case, the less significant 4 bits of the identifier (ID) 451x are used to identify subscriber station 1. The next 7 bits of identifier (ID) 451x are used to communicate that additional frames 460 will follow. 0 ×14, for example, may signal that subscriber station 4 transmits a frame, the 1 signaling that the frame is followed by additional frames. 0 ×04 could then signal that subscriber station 4 transmits a frame, the 0 signaling that the frame is not followed by additional frames.

According to another possibility for signaling that subscriber station 1 is transmitting an additional frame 450 in this transmit opportunity TO, a field DataType (DT) may be used in the header of frame 450. DT=0x30, for example, may signal that no additional frame of the same subscriber station follows. DT=0 ×31 could therefore signal that one additional frame of the same subscriber station follows.

Alternatively, according to yet another possibility for signaling, it is possible to use a dedicated bit in the header of frame 460.

Alternatively, according to yet another possibility for signaling, it is possible to use a bit or byte at the beginning of the data field DF, shown in FIG. 2, in the data phase 452.

The advantage is that more fairness may be established with regard to the distribution of the communication bandwidth between subscriber stations 1, 2, 3, 4 in the case in which subscriber stations 1, 2, 3, 4 transmit frames 450, 460 of different lengths.

According to a seventh exemplary embodiment, it is possible that the number SN of the time slots is set in the scheduling units 15, 25, 35 to be greater than the number N of subscriber stations. In this case, at least one time slot remains, which belongs to none of the subscriber stations and thus to no one on bus 40. If this is combined with the third exemplary embodiment, where it is explained how the other subscriber stations are able to use unused time slots, then the surplus time slots may be used by any subscriber station.

Since in principle all subscriber stations may transmit simultaneously in the surplus time slots and thus arbitrate over bus 40, this corresponds to strict priority scheduling.

The bus has N=4 subscriber stations, for example, that is, the subscriber stations 1, 2, 3, 4, and SN=5 time slots, that is, the time slots S1, S2, S3, S4, S5. One time slot is assigned to each subscriber station exclusively. Since in time slot S5, a node will never transmit immediately, the nodes are able to arbitrate over time slot S5 starting with the second bit of the time slot.

Alternatively, this seventh exemplary embodiment may also be implemented as an extension of the second exemplary embodiment. Scheduling units 15, 25, 35 not only have the number SN of time slots configured, but also the number of time slots that are available to all subscriber stations, for example at the end of cycle C. If the time slots are firmly assigned to the subscriber stations and the time slot number is contained in the transmitted frame, then a scheduling unit is able to detect the time slot S5 (from the previous example). When time slot S5 has arrived, all subscriber stations may simply arbitrate here over bus 40. The combination with the third exemplary embodiment is no longer necessary.

Since every one of subscriber stations 1, 2, 3, 4 is able to transmit in time slot S5, the allocation of transmit opportunity TO in time slot S5 is strictly in accordance with the priority, that is, the identifier 451x of the frames, which the subscriber stations 1, 2, 3, 4 transmit in time slot S5 (strict priority scheduling). The frame identifier 451x of messages 450, 460 is to be selected in this time slot S5 expediently in accordance with the actual priority of the messages, so that the frame having the highest priority is able to prevail.

According to an eighth exemplary embodiment, it is possible to eliminate the arbitration phase 451 in the communication entirely or at least partially. As a result, in normal operation, in deterministic scheduling using scheduling units 15, 25, 35, there is no arbitration, because one or multiple time slots S1, S2, S3, S4 are assigned to every subscriber station 1, 2, 3, 4. Consequently, following the assignment of the time slots S1, S2, S3, S4 or at this operating point, the arbitration phase 451 may be omitted entirely or at least partially prior to and following the data phase 452.

As a result, the arbitration phase 451 is now shorter than in CAN, that is, shorter than currently defined in ISO 11898-1:2015.

In such a case, the following two operating modes exist. In a first operating mode, upon being switched on, all subscriber stations 1, 2, 3, 4 use normal CAN frames or CAN XL frames, because arbitration may occur on the bus. As soon as all subscriber stations 1, 2, 3, 4 are in operation and all subscriber stations 1, 2, 3, 4 are synchronized to time slots S1, S2, S3, S4, arbitration will consequently no longer occur. For this reason, the system may now be switched into the second operating mode, in which the arbitration phase 451 is omitted entirely or at least partially.

This makes it possible to avoid the case that the arbitration phase 451 with its relatively long bits, which are situated before and after the data phase 452, results in a relevant overhead in the data transmission on bus 40 and thus in a lower net data rate.

According to a ninth exemplary embodiment, it is possible that the identifiers 451x, which are used for transmitting the frames 450, 460, are divided into two ranges. First, into a high priority range, which is used for those frames 450, 460 that are transmitted by a subscriber station in the time slot assigned to the subscriber station. And second, into a low priority range, which is used for those frames that are transmitted in a time slot that is not exclusively assigned to the transmitting subscriber station.

In order to attempt to use a time slot that is exclusively assigned to another subscriber station, subscriber station 1 for example, to which for example the currently present time slot S3 is not exclusively assigned, must simply use an identifier 451x from the low priority range when attempting to transmit frame 450, 460. This ensures that for example subscriber station 3, to which in this example the currently present time slot S3 is exclusively assigned, would always win the arbitration and that thus this time slot S3 remains exclusively assigned to subscriber station 3. If, however, in this example at least one of the other subscriber stations 1, 2, 4 has something to transmit, then this other subscriber station 1, 2, 4 may attempt right at the beginning of time slot S3 to transmit a frame 450, 460 with an identifier 451x from the low-priority range.

This has the advantage that in the present exemplary embodiment the minimum time slot duration T_S_mn remains at an arbitration bit time, whereas in the third exemplary embodiment the minimum time slot duration T_S_mn amounts to two arbitration bit times.

All the above-described developments of subscriber stations 1, 2, 3, 4, 10, 20, 30 of bus system 100 and the methods carried out therein may be used individually or in all possible combinations. In particular, all features of the above-described exemplary embodiments and/or of their modifications may be combined in any manner. Additionally or alternatively, particularly the following modifications are possible.

Although the present invention was described above with reference to the example of the CAN bus system, the present invention may be used in any communication network and/or communication method. In particular, two different communication phases may be used in the communication network and/or communication method, as described above with reference to the communication phases 451, 452.

In particular, bus system 100 according to the exemplary embodiments may be a communication network, in which data are serially transmittable at two different bit rates. It is advantageous, but not an unavoidable presupposition, that in bus system 100, at least for certain time periods, exclusive, collision-free access by a subscriber station 10, 20, 30 to a common channel is ensured.

The number and the arrangement of the subscriber stations 10, 20, 30 in bus systems 100 of the exemplary embodiments is a matter of choice. In particular, subscriber station 20 in bus system 100 may be omitted. It is possible that one or multiple subscriber stations 10 or 30 exist in bus system 100. It is possible that all subscriber stations in bus system 100 are developed identically, that is, that only subscriber stations 10 or only subscriber stations 30 exist.

The deterministic scheduling performed by scheduling units 15, 25, 35 may be switched on or switched off at any time so as to adapt to the current operating states of bus system 100. In real-time operation, for example, the deterministic scheduling is used. The deterministic scheduling may be switched off, on the other hand, in a workshop when flashing new firmware versions.

Additionally or alternatively, it is possible that in an operation of the deterministic scheduling, the previously described parameters SN, W, which are used by scheduling units 15, 25, 35, may be changed as desired in continuous operation.

What is claimed is:

1. A subscriber station for a serial bus system, comprising
    a communication control device to control a communication of the subscriber station with at least one other subscriber station of the bus system;
    a transmitting/receiving device to transmit a transmission signal, generated by the communication control device, in a frame on a bus of the bus system; and
    a scheduling unit to plan a temporal access of the subscriber station to the bus in at least one time slot of a cycle of temporally consecutive time slots, at least one time slot being provided in the cycle for each subscriber station of the bus for transmitting its transmission signal and the cycle being repeated cyclically, and the scheduling unit is configured to determine, together with the other subscriber stations of the bus in an operation of the bus system by using a priority of the transmission signal, which time slot of the cycle the transmitting/receiving device may use for transmitting the frame for the transmission signal on the bus;
    wherein the scheduling unit includes a counting module configured to increment its count value with each frame received from the bus and to increment the count value with each transmit opportunity that has elapsed unused for a time slot, and the counting module is configured to reset the count value to a starting value when the count value is equal to a number of time slots which are provided in each cycle.

2. The subscriber station as recited in claim 1, wherein the scheduling unit is configured to determine, together with the other subscriber stations of the bus, a transmission order on the bus for the subscriber stations of the bus in an at least temporarily dynamic manner and/or in an at least temporarily static manner.

3. The subscriber station as recited in claim 1, wherein the counting module is configured to increment its count value with every frame received from the bus following reception of a bit, which signals a beginning of a frame, even if the received frame is later aborted by a subscriber station transmitting the frame due to an error.

4. The subscriber station as recited in claim 1, wherein the scheduling unit is configured to approve a temporal access of the subscriber station to the bus for a next time slot of the cycle when the count value of the counting module is equal to the number of the time slots that are provided in the cycle, and the counting module is configured to set its count value to 1 when the transmitting/receiving device has transmitted the transmission signal, generated by the communication control device, in a frame on the bus or lets a transmit opportunity elapse unused.

5. The subscriber station as recited in claim 1, wherein the communication control device is configured to partition the frame into a first communication phase and a second communication phase at least in a switch-on phase of the bus, and in the first communication phase, a negotiation takes place to determine which of the subscriber stations of the bus is granted an at least temporarily exclusive, collision-free access to the bus in a subsequent second communication phase.

6. The subscriber station as recited in claim 5, wherein a minimum duration of each time slot is a bit time of a bit of the first communication phase, and the scheduling unit is configured to transmit, in a time slot assigned to the subscriber station, a frame having a priority that is higher than a priority of a frame which the scheduling unit is configured to transmit in a time slot that is assigned to another subscriber station of the bus.

7. The subscriber station as recited in claim 1, wherein the communication control device is configured to situate a subscriber station number assigned exclusively to the subscriber station on the bus, in the transmission signal, and the scheduling unit is configured to approve a temporal access of the subscriber station to the bus in the time slot assigned to the subscriber station if the scheduling unit is able to evaluate a subscriber station number in a frame received from the bus.

8. The subscriber station as recited in claim 1, wherein a number of time slots which are assigned to the subscriber station per cycle, is at least temporarily unequal to a number of time slots, which are assigned to another subscriber station of the bus per cycle.

9. The subscriber station as recited in claim 1, wherein the subscriber station is configured to transmit per time slot more than one frame on the bus, and/or a number of frames which the subscriber station is allowed to transmit per time slot on the bus, is at least temporarily unequal to a number of frames which another subscriber station of the bus is allowed to transmit per time slot on the bus.

10. The subscriber station as recited in claim 1, wherein the subscriber station is configured so that the scheduling unit is switchable on or off depending on time requirements of the communication on the bus, or is configured in such a way that an operating mode of the scheduling unit is changeable by configuration of predetermined parameters in a continuous operation of the bus system, the operating mode of the scheduling unit setting a predetermined mode of a communication on the bus.

11. A subscriber station for a serial bus system, comprising
   a communication control device to control a communication of the subscriber station with at least one other subscriber station of the bus system;
   a transmitting/receiving device to transmit a transmission signal, generated by the communication control device, in a frame on a bus of the bus system; and
   a scheduling unit to plan a temporal access of the subscriber station to the bus in at least one time slot of a cycle of temporally consecutive time slots, at least one time slot being provided in the cycle for each subscriber station of the bus for transmitting its transmission signal and the cycle being repeated cyclically, and the scheduling unit is configured to determine, together with the other subscriber stations of the bus in an operation of the bus system by using a priority of the transmission signal, which time slot of the cycle the transmitting/receiving device may use for transmitting the frame for the transmission signal on the bus;
   wherein the communication control device is configured to partition the frame into a first communication phase and a second communication phase at least in a switch-on phase of the bus, and in the first communication phase, a negotiation takes place to determine which of the subscriber stations of the bus is granted an at least temporarily exclusive, collision-free access to the bus in a subsequent second communication phase, and
   wherein a number of the time slots per cycle is greater than a number of time slots which are assigned to the subscriber stations of the bus per cycle, and in a time slot which is not assigned to any of the subscriber stations of the bus, in the first communication phase, the negotiation takes place to determine which of the subscriber stations of the bus is granted the at least temporarily exclusive, collision-free access to the bus in the subsequent second communication phase.

12. A subscriber station for a serial bus system, comprising
   a communication control device to control a communication of the subscriber station with at least one other subscriber station of the bus system;
   a transmitting/receiving device to transmit a transmission signal, generated by the communication control device, in a frame on a bus of the bus system; and
   a scheduling unit to plan a temporal access of the subscriber station to the bus in at least one time slot of a cycle of temporally consecutive time slots, at least one time slot being provided in the cycle for each subscriber station of the bus for transmitting its transmission signal and the cycle being repeated cyclically, and the scheduling unit is configured to determine, together with the other subscriber stations of the bus in an operation of the bus system by using a priority of the transmission signal, which time slot of the cycle the transmitting/receiving device may use for transmitting the frame for the transmission signal on the bus;
   wherein the communication control device is configured to partition the frame into a first communication phase and a second communication phase at least in a switch-on phase of the bus, and in the first communication phase, a negotiation takes place to determine which of the subscriber stations of the bus is granted an at least temporarily exclusive, collision-free access to the bus in a subsequent second communication phase, and wherein a minimum duration of each time slot is two bit times of a bit of the first communication phase, and wherein the scheduling unit is configured to approve a temporal access of the subscriber station to the bus in a second bit of a time slot of the cycle if another subscriber station of the bus lets its transmit opportunity elapse unused in a first bit of the time slot.

13. A subscriber station for a serial bus system, comprising a communication control device to control a communication of the subscriber station with at least one other subscriber station of the bus system;

a transmitting/receiving device to transmit a transmission signal, generated by the communication control device, in a frame on a bus of the bus system; and a scheduling unit to plan a temporal access of the subscriber station to the bus in at least one time slot of a cycle of temporally consecutive time slots, at least one time slot being provided in the cycle for each subscriber station of the bus for transmitting its transmission signal and the cycle being repeated cyclically, and the scheduling unit is configured to determine, together with the other subscriber stations of the bus in an operation of the bus system by using a priority of the transmission signal, which time slot of the cycle the transmitting/receiving device may use for transmitting the frame for the transmission signal on the bus;

wherein the communication control device is configured to transmit at a beginning of a recessive bit in a time slot assigned to the subscriber station a dominant pulse that is shorter than a bit time of a recessive bit if the communication control device lets its transmit opportunity elapse unused.

14. A bus system, comprising:

a bus; and at least two subscriber stations, which are connected to one another via the bus so that they are able to communicate with one another serially, wherein each of the subscriber stations includes:

a communication control device to control a communication of the subscriber station with at least one other subscriber station of the bus system;

a transmitting/receiving device to transmit a transmission signal generated by the communication control device in a frame on the bus of the bus system; and a scheduling unit to plan a temporal access of the subscriber station to the bus in at least one time slot of a cycle of temporally consecutive time slots, at least one time slot being provided in the cycle for each subscriber station of the bus for transmitting its transmission signal and the cycle being repeated cyclically, and the scheduling unit is configured to determine, together with the other subscriber stations of the bus in an operation of the bus system by using a priority of the transmission signal, which time slot of the cycle the transmitting/receiving device may use for transmitting the frame for the transmission signal on the bus;

wherein the scheduling unit includes a counting module configured to increment its count value with each frame received from the bus and to increment the count value with each transmit opportunity that has elapsed unused for a time slot, and the counting module is configured to reset the count value to a starting value when the count value is equal to a number of time slots which are provided in each cycle.

15. A method for communicating in a serial bus system, the method comprising:

controlling, using a communication control device, a communication of the subscriber station with at least one other subscriber station of the serial bus system, wherein the communication includes using the subscriber station of the serial bus system, and wherein the subscriber station includes the communication control device and a transmitting/receiving device; and transmitting in a frame on a bus of the bus system, using the transmitting/receiving device, a transmission signal generated by the communication control device, the transmitting being in accordance with a scheduling of a scheduling unit, which schedules a temporal access of the subscriber station to the bus in at least one time slot of a cycle of temporally consecutive time slots, at least one time slot being provided in the cycle for each subscriber station of the bus for transmitting its transmission signal and the cycle being repeated cyclically, and the scheduling unit determining, together with the other subscriber stations of the bus in an operation of the bus system by using a priority of the transmission signal, which time slot of the cycle the transmitting/receiving device may use for transmitting the frame for the transmission signal on the bus;

wherein the scheduling unit includes a counting module configured to increment its count value with each frame received from the bus and to increment the count value with each transmit opportunity that has elapsed unused for a time slot, and the counting module is configured to reset the count value to a starting value when the count value is equal to a number of time slots which are provided in each cycle.

* * * * *